United States Patent
Calciu et al.

(10) Patent No.: US 11,360,776 B2
(45) Date of Patent: Jun. 14, 2022

(54) MACHINE LEARNING FOR WORKLOADS FOR INSTRUCTION SET ARCHITECTURE OPTIMIZATION

(71) Applicant: LENOVO Enterprise Solutions (Singapore) PTE. LTD., New Tech Park (SG)

(72) Inventors: Corneliu-Ilie Calciu, Bucharest (RO); Fred Bower, III, Durham, NC (US); Roberto Jacob Da Silva, Oak Park, CA (US); Radu Iorga, Bucharest (RO)

(73) Assignee: LENOVO Enterprise Solutions (Singapore) PTE. LTD., New Tech Park (SG)

(*) Notice: Subject to any disclaimer, the term of this patent is extended or adjusted under 35 U.S.C. 154(b) by 153 days.

(21) Appl. No.: 17/039,467

(22) Filed: Sep. 30, 2020

(65) Prior Publication Data

US 2022/0100525 A1    Mar. 31, 2022

(51) Int. Cl.
G06F 8/41 (2018.01)
G06F 9/38 (2018.01)
G06N 3/08 (2006.01)

(52) U.S. Cl.
CPC ............ *G06F 9/3838* (2013.01); *G06F 8/48* (2013.01); *G06N 3/08* (2013.01)

(58) Field of Classification Search
CPC ....................................................... G06F 8/48
See application file for complete search history.

(56) References Cited

U.S. PATENT DOCUMENTS

| | | | |
|---|---|---|---|
| 2005/0044197 A1* | 2/2005 | Lai .......................... | H04L 67/16 709/223 |
| 2009/0228893 A1* | 9/2009 | Behrendt .......... | H05K 7/20836 718/105 |
| 2011/0126275 A1* | 5/2011 | Anderson .......... | H04L 63/0807 726/8 |
| 2013/0305219 A1* | 11/2013 | Lee .......................... | G06F 8/36 717/110 |

OTHER PUBLICATIONS

Sparsh Mittal, "A Survey on Optimized Implementation of Deep Learning Models on the NVIDIA Jetson Platform", Research Gate, Dec. 2018, pp. 1-24.

(Continued)

*Primary Examiner* — Jae U Jeon
(74) *Attorney, Agent, or Firm* — Kunzler Bean & Adamson; Bruce R. Needham (57) ABSTRACT

An apparatus for machine learning for workloads for ISA optimization is disclosed. The apparatus includes a processor and a memory that stores code executable by the processor. The executable code is executable to run program code to service a workload with a default instruction set of the processor, identify an instruction sequence from execution results for the workload, the instruction sequence called repeatedly during execution for the workload, and generate a custom instruction that includes the instruction sequence. The executable code is executable to write the custom instruction to a writable area of processor memory storing the default instruction set, recompile program code used to service the workload, where the recompiled program code includes the custom instruction, and run the recompiled program code to service the workload.

20 Claims, 7 Drawing Sheets

(56) References Cited

OTHER PUBLICATIONS

Sparsh Mittal, "A Survey of FPGA-based Accelerators for Convolutional Neural Networks", https://link.springer.com/article/10.1007/s00521-018-3761-1, Oct. 2018, pp. 1-32.
Kalin Ovtcharov et. al., "Accelerating Deep Convolutional Neural Networks Using Specialized Hardware", https://www.microsoft.com/en-us/research/wp-content/uploads/2016/02/CNN20Whitepaper.pdf, Feb. 22, 2015, pp. 1-4.
Intel Movidius Neural Compute Stick, https://software.intel.com/en-us/articles/intel-movidius-neural-compute-stick, Aug. 22, 2018, pp. 1-5.
Microcode, https://wiki.archlinux.org/index.php/microcode, Downloaded as early as May 5, 2020, pp. 1-7.
Baruch Solomon et .al., "Micro-Operation Cache: A Power Aware Frontend for Variable Instruction Length ISA", IEEE Transactions on Very Large Scale Integration (VLSI) Systems vol. 11, Issue 5, Oct. 2033, pp. 1-6.
Marco D. Santambrogio, "From Reconfigurable Architectures to Self-Adaptive Autonomic Systems", 2009 International Conference on Computational Science and Engineering, 2009, pp. 1-7.
Banu Nagasundaram A1 Product Marketing Manager, "Understanding and Integrating Intel Deep Learning Boost (Intel DL Boost)", Intel, Downloaded as early as May 5, 2020, pp. 1-32.
Wikichip, "Skylake (client)—Microarchitectures—Intel—Wikichip", Downloaded as early as May 5, 2020, pp. 1-37.
Wikipedia, "Dataflow Architecture", Downloaded as early as May 5, 2020, pp. 1-3.

* cited by examiner

MACHINE LEARNING FOR WORKLOADS FOR INSTRUCTION SET ARCHITECTURE OPTIMIZATION

FIELD

The subject matter disclosed herein relates to complex instruction set computer ("CISC") processors and more particularly relates to creating and using custom instructions on the fly for CISC processors.

BACKGROUND

Deep neural networks ("DNN") often require significant computing resources and often include similar processing for various input nodes so that execution of workloads for deep neural networks include a high amount of repetition of some instruction sequences. Other workloads, such as routers and firewalls for software defined networks ("SDN") also include often repeated instruction sequences. To service such workloads, one method in common use is to develop custom hardware such as specialized accelerators based on application specific integrated circuits ("ASICs") or other hardware. Other efforts involve use of specialized graphical processor units ("GPUs"). Other ways to deal with these workloads include the use of field programmable gate array ("FPGA")-based architectures and libraries, which may accelerate machine-learning tasks. Another solution is for a manufacturer to create a custom instruction set to be shipped with a processor. Each of the above solutions typically requires a lot of expense and does not allow for customization on-the-fly, or both.

BRIEF SUMMARY

An apparatus for machine learning for workloads for ISA optimization is disclosed. A method and computer program product also perform the functions of the apparatus. The apparatus includes a processor and a memory that stores code executable by the processor. The executable code is executable to run program code to service a workload with a default instruction set of the processor, identify an instruction sequence from execution results for the workload, the instruction sequence called repeatedly during execution for the workload, and generate a custom instruction that include the instruction sequence. The executable code is executable to write the custom instruction to a writable area of processor memory storing the default instruction set, recompile program code used to service the workload, where the recompiled program code includes the custom instruction, and run the recompiled program code to service the workload.

A method for machine learning for workloads for ISA optimization includes running program code to service a workload with a default instruction set of a processor, identifying an instruction sequence from execution results for the workload, where the instruction sequence is called repeatedly during execution for the workload and generating a custom instruction that includes the instruction sequence. The method includes writing the custom instruction to a writable area of processor memory storing the default instruction set, recompiling program code used to service the workload where the recompiled program code includes the custom instruction and running the recompiled program code to service the workload.

A program product includes a computer readable storage medium and program code where the program code is configured to be executable by a processor to perform operations that include running program code to service a workload with a default instruction set of the processor, identifying an instruction sequence from execution results for the workload where the instruction sequence is called repeatedly during execution for the workload and generating a custom instruction that includes the instruction sequence. The program code is configured to perform operations that include writing the custom instruction to a writable area of processor memory storing the default instruction set, recompiling program code used to service the workload, where the recompiled program code includes the custom instruction, and running the recompiled program code to service the workload.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, executable code, computer readable code, and/or program code, which may be referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be partially or fully implemented as a hardware circuit comprising custom circuits or gate arrays, off-the-shelf semiconductors such as logic chips, transistors, or other discrete components. In some examples, a module may be implemented partially as hardware circuits and partially with code and/or software.

Modules may also be implemented in code and/or software for execution by various types of processors capable of using custom instructions. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for machine learning for workloads for ISA optimization is disclosed. A method and computer program product also perform the functions of the apparatus. The apparatus includes a processor and a memory that stores code executable by the processor. The executable code is executable to run program code to service a workload with a default instruction set of the processor, identify an instruction sequence from execution results for the workload, the instruction sequence called repeatedly during execution for the workload, and generate a custom instruction that include the instruction sequence. The executable code is executable to write the custom instruction to a writable area of processor memory storing the default instruction set, recompile program code used to service the workload, where the recompiled program code includes the custom instruction, and run the recompiled program code to service the workload.

In some embodiments, the executable code executable by the processor is further executable by the processor to remove the custom instruction from the writable area of the processor in response to completion of the workload. In other embodiments, the executable code executable by the processor is further executable by the processor to disable at least one default instruction of the default instruction set prior to writing the custom instruction to the writeable area of the processor memory. In other embodiments, the default instruction set is stored in a microcode sequencer of the processor. The microcode sequencer includes the writable area and at least the writable area of the microcode sequencer includes random access memory ("RAM"). In further embodiments, the processor includes an ISA update block that loads and deletes the custom instruction from the microcode sequencer.

In some embodiments, identifying an instruction sequence from execution results for the workload includes identifying an instruction sequence most frequency called during execution for the workload and/or identifying an instruction sequence that takes a highest amount of processing resources during execution for the workload. In other embodiments, recompiling the program code used to service the workload includes using a compiler associated with the processor to recompile the program code. The compiler accesses the custom instruction to recompile the program code.

In some embodiments, the custom instruction includes a sequence of micro-operations corresponding to micro-operations of the instruction sequence where the instructions of the instruction sequence are instructions in the default instruction set. In other embodiments, the program code to service the workload includes an application and/or a function from a library. In other embodiments, the workload includes a deep neural network and/or a SDN.

A method for machine learning for workloads for ISA optimization includes running program code to service a workload with a default instruction set of a processor, identifying an instruction sequence from execution results for the workload, where the instruction sequence is called repeatedly during execution for the workload and generating a custom instruction that includes the instruction sequence. The method includes writing the custom instruction to a writable area of processor memory storing the default instruction set, recompiling program code used to service the workload where the recompiled program code includes the custom instruction and running the recompiled program code to service the workload.

In some embodiments, the method includes removing the custom instruction from the writable area of the processor in response to completion of the workload. In other embodiments, the method includes disabling at least one default instruction of the default instruction set prior to writing the custom instruction to the writeable area of the processor memory. In other embodiments, the default instruction set is stored in a microcode sequencer of the processor. The microcode sequencer includes the writable area and at least the writable area of the microcode sequencer includes RAM. In further embodiments, the processor includes an ISA update block that loads and deletes the custom instruction from the microcode sequencer.

In some embodiments, identifying an instruction sequence from execution results for the workload includes identifying an instruction sequence most frequency called during execution for the workload and/or identifying an instruction sequence that takes a highest amount of processing resources during execution for the workload. In other embodiments, the processor uses a compiler in the processor to identify the instruction sequence from execution results for the workload and to generate the custom instruction.

A program product includes a computer readable storage medium and program code where the program code is configured to be executable by a processor to perform operations that include running program code to service a workload with a default instruction set of the processor, identifying an instruction sequence from execution results for the workload where the instruction sequence is called repeatedly during execution for the workload and generating a custom instruction that includes the instruction sequence. The program code is configured to perform operations that include writing the custom instruction to a writable area of processor memory storing the default instruction set, recompiling program code used to service the workload, where the recompiled program code includes the custom instruction, and running the recompiled program code to service the workload.

In some embodiments, the program code is further configured to perform operations that include removing the custom instruction from the writable area of the processor in response to completion of the workload. In other embodiments, the default instruction set is stored in a microcode sequencer of the processor where the microcode sequencer includes the writable area. At least the writable area of the microcode sequencer includes RAM and the processor includes an ISA update block that loads and deletes the custom instruction from the microcode sequencer.

Figure 1:
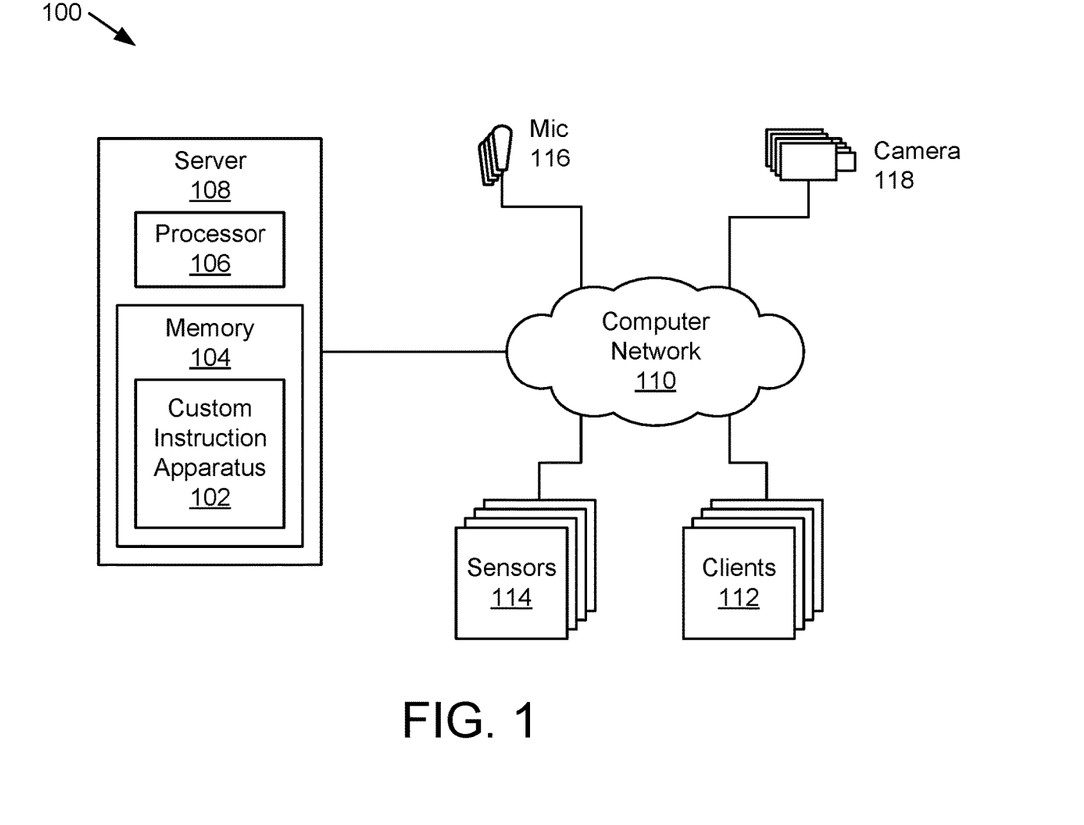
FIG. 1 is a schematic block diagram illustrating one embodiment of a system for machine learning for workloads for instruction set architecture ("ISA") optimization.

FIG. 1 is a schematic block diagram illustrating one embodiment of a system 100 for machine learning for workloads for ISA optimization. The system 100 includes a custom instruction apparatus 102 in memory 104 connected to a processor 106 of a server 108, a computer network 110, clients 112, sensors 114, microphones 116 and cameras 118, which are described below.

The custom instruction apparatus 102 uses a profiler to identify one or more repeating instruction sequences from execution results for program code of an application or functions from a library servicing a workload. In some embodiments, the custom instruction apparatus 102 is implemented in executable code stored on computer readable storage media, such as memory 104 or other nonvolatile memory accessible to the processor 106. The executable code of the custom instruction apparatus 102 call on other program code of an application, function of a library, etc. used to service a workload. Servicing the workload as used herein includes running an application, function(s), or other program code in a particular environment, location, etc. with particular inputs, parameters, outputs, etc. particular to the location, problem being solved, or other specific use of the application, function, etc.

The custom instruction apparatus 102 creates a custom instruction using an instruction sequence identified by the profiler, which is then written into a writeable area of processor memory 104 for use by the processor 106 while executing program code to service the workload. The custom instruction apparatus 102 uses a compiler of the processor 106 recompiles program code of the application or function where the recompiled program code uses the custom instruction. The custom instruction apparatus 102 runs the recompiled program code to service the workload. Beneficially, running the recompiled program code and making use of the custom instruction reduces the number of executed instructions, which improves usage of the instruction cache. In addition, use of a custom instruction improves code density. Also, the custom instruction apparatus 102 allows modification of a default instruction set of the processor 106 on the fly to service particular workloads rather than relying on creation of new hardware or custom instruction sets from makers of the processor 106. In some embodiments, the custom instruction apparatus 102 creates two or more custom instructions. The custom instruction apparatus 102 is discussed in more detail below with regard to the apparatuses 400, 500 of FIGS. 4 and 5.

The processor 106, in one embodiment, is a complex instruction set computer ("CISC") with a writable area in the memory 104 where other instructions of the processor 106 are stored. Typically, a default instruction set is written to read-only memory ("ROM") when a processor is created. The processor 106 includes a modification where at least a portion of an area in the memory 104 of the processor 106 where the default instructions are stored is writable. For example, the processor 106 may include a microcode sequencer that includes ROM with some or all of the default instructions of the default instruction set and random access memory ("RAM"), such as static RAM ("SRAM"), where the custom instruction apparatus 102 writes the custom instruction(s). In some embodiments, the microcode sequencer or other location where instructions are stored includes RAM for the default instructions of the default instruction set and the custom instruction(s).

The processor 106, in some embodiments, also includes an ISA update block that writes the custom instruction to the writable area of the processor memory 104, such as in the microcode sequencer. In some embodiments, the ISA update block is directed by the custom instruction apparatus 102. In other embodiments, the ISA update block removes the custom instruction once the workload is complete.

The custom instruction apparatus 102 is in memory 104, which is connected to the processor 106. Typically, the memory 104 is divided into multiple types, such as L1 cache, L2 cache, L3 cache, or other non-persistent storage, etc. The memory 104 may also include persistent storage, such as solid-state storage ("SSD"), a hard-disk drive ("HDD"), etc. For example, the custom instruction apparatus 102 may be stored in persistent storage and loaded into RAM or other nonpersistent storage for execution by the processor 106.

In the system 100 of FIG. 1, the processor 106 and memory 104 are depicted in a server 108. In other embodiments, the processor 106 and memory 104 with the custom instruction apparatus 102 are in another computing device, such as a desktop computer, a workstation, a rack-mounted computer, a laptop, a table, a smartphone, etc. The server 108 is connected to a computer network 110, which is connected to one or more clients 112, sensors 114, microphones 116 and/or cameras 118. The computer network 110 may also connect to other devices. The clients 112, sensors 114, microphones 116, cameras 118, etc. may be used to provide input to the server 108 for execution of the program code servicing the workload. For example, the workload may be for a deep neural network ("DNN") and one or more of the clients 112, sensors 114, microphones 116, cameras 118, etc. may provide input to the deep neural network.

Often, deep neural networks include many inputs and processing of the inputs typically include multiplication of each input by a constant where the constants are modified by training the deep neural network. This multiplication step and other steps of processing inputs to a deep neural network include repetition of instruction sequences. In addition, processing of a deep neural network may include matrix operations, which often include repetition of instruction sequences. The custom instruction apparatus 102 beneficially combines repetitive instruction sequences into one or more custom instructions, which reduces execution time and complexity for deep neural network processing. Other types of workloads may also benefit from the use of the custom instruction apparatus, such as components of a software defined network ("SDN"), a workload that uses linear algebra, etc. The system 100 depicted in FIG. 1 is merely an example and one of skill in the art will recognize other situations where a processor 106 and memory with a custom instruction apparatus 102 is useful.

The computer network 110 may be wired, wireless, a fiber network, etc. The computer network 110 may include two or more networks, such as a local area network ("LAN"), a wide area network ("WAN"), the internet, a wireless network, etc. The computer network 110 may include switches, routers, servers, cabling, wireless access points, etc.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

Figure 2:
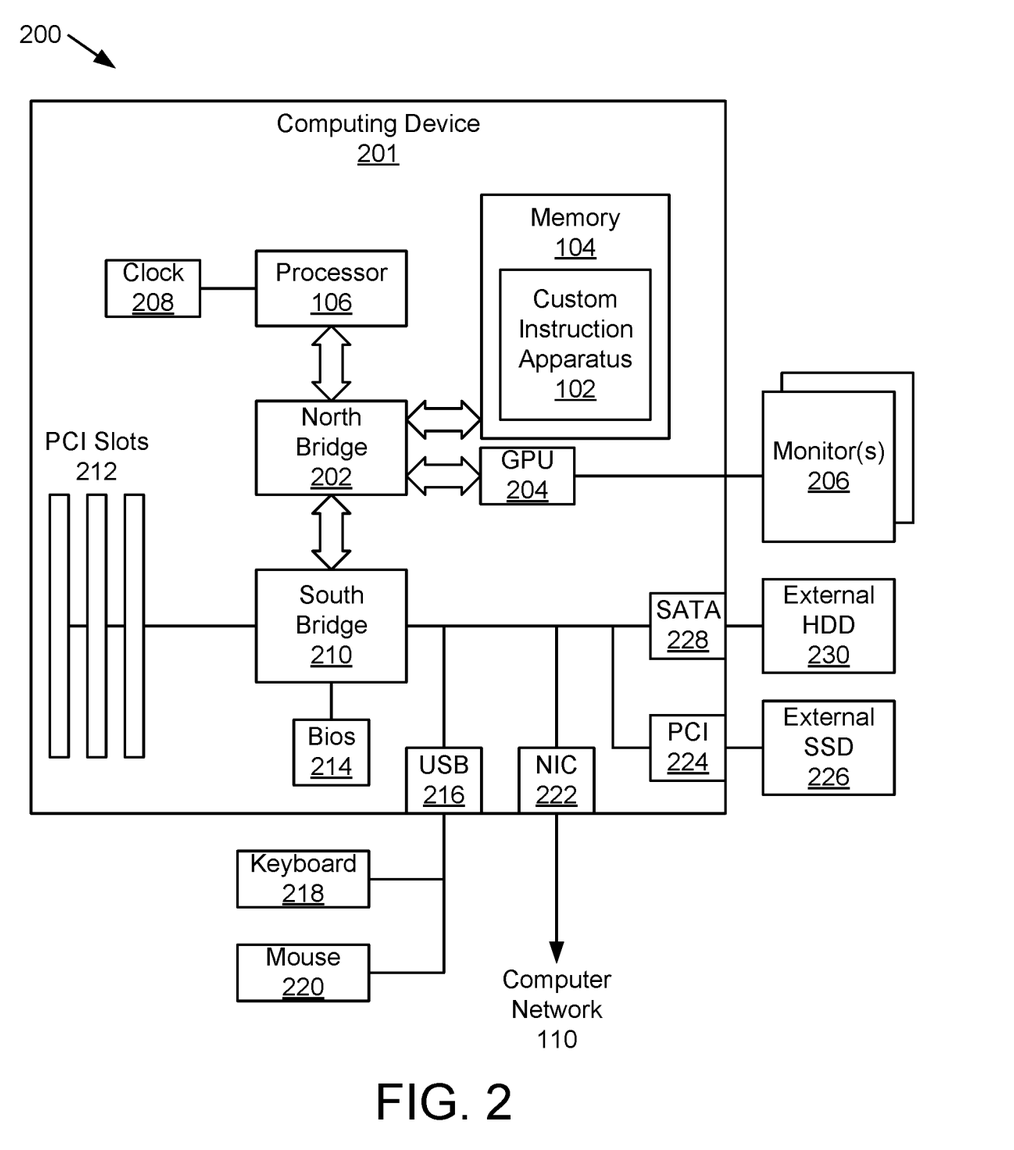
FIG. 2 is a schematic block diagram illustrating one embodiment of a computing device for machine learning for workloads for ISA optimization.

FIG. 2 is a schematic block diagram illustrating one embodiment 200 of a computing device 201 for machine learning for workloads for ISA optimization. The computing device 201 includes a processor 106 and memory 104 with a custom instruction apparatus 102. The embodiment 200 is one example of a computing device 201 where the custom instruction apparatus 102 may be used. The computing device 201 includes a north bridge 202 connected to the memory 104 and a graphic processing unit ("GPU") 204 or similar device, which provides input to one or more monitors 206. Typically, the north bridge 202 is capable of handling high-speed data transfers to memory 104, the GPU 204, etc. The computing device 201 includes a clock 208 connected to the processor 106, which provides a clock signal for timing.

A southbridge 210 is connected to the north bridge 202 and provides connection to various devices, which are typically slower speed than devices connected to the north bridge 202. For example, the southbridge 210 may be connected to peripheral component interconnect ("PCI") slots 212 for connection to internal storage devices, television tuners, sound cards, disk controllers, and other equipment. The southbridge 210 may also connect to a basic input/output system ("BIOS") 214 for loading firmware used to provide hardware utilization, startup, etc. The southbridge 210 may connect to universal serial bus ("USB") ports 216, which may be used to connect to a keyboard 218, a mouse 220, a track ball, a camera, a microphone, non-volatile storage, etc. The southbridge 210 may connect to a network interface card ("NIC"), which connects to the computer network 110. The southbridge 210 may connect to a PCI port 224 for connection to various devices, such as an external SSD 226 or other device. The southbridge 210 may connect to a serial AT attachment ("SATA") port 228, for connection to a hard disk drive ("HDD") 230 or other device. One of skill in the art will recognize other architectures where a processor 106 connected to a memory 104 with a custom instruction apparatus 102 may be useful.

Figure 3:
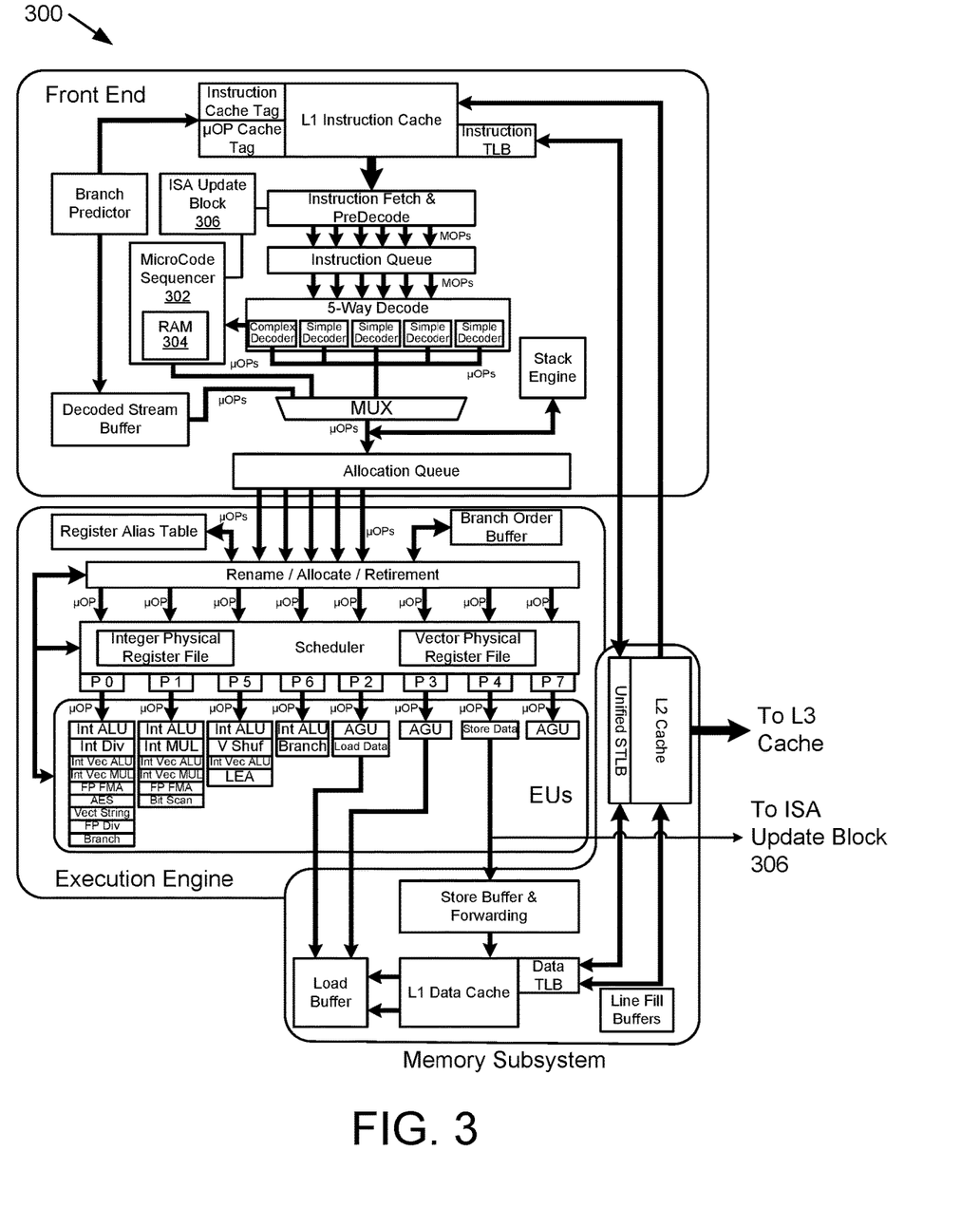
FIG. 3 is a schematic block diagram illustrating one embodiment of an example of a specific processor for machine learning for workloads for ISA optimization.

FIG. 3 is a schematic block diagram illustrating one embodiment of an example of a specific processor 300 for machine learning for workloads for ISA optimization. The processor 300 is one embodiment of an Intel® Cascade lake architecture modified to include a microcode sequencer 302 with RAM 304 for a custom instruction and an ISA update block 306. Typically, a microcode sequencer includes default instructions. In the embodiment, the microcode sequencer 302 includes RAM 304, which is writeable. The ISA update block 306 is responsive to the custom instruction apparatus 102, which may be executable code stored in memory 104, such as an SSD, HDD, etc. connected to the processor 300, and loaded into non-persistent storage of the processor 300 for execution.

In one embodiment, the ISA update block 306 loads one or more custom instructions into the RAM 304 of the microcode sequencer 302, which may then be accessed by the processor 300 responsive to compiled program code calling on the custom instructions. In some embodiments, the microcode sequencer 302 includes enough memory for the custom instructions and the ISA update block 306 loads the custom instructions without deactivating any other default instructions of the default instruction set. In other embodiments, the custom instructions exceed capacity of memory and/or RAM 304 of the microcode sequencer 302 and the custom instruction apparatus 102 commands the ISA update block 306 to deactivate one or more default instructions of the default instruction set prior to loading the custom instructions. For example, the ISA update block 306 may deactivate rarely used instructions.

In some embodiments, once the workload has been executed, the custom instruction apparatus 102 commands the ISA update block 306 to remove the custom instructions from the microcode sequencer 302. In other embodiments, after the ISA update block 306 removes the custom instructions, the custom instruction apparatus 102 commands the ISA update block 306 to restore any deactivated instructions. While the processor 300 depicted in FIG. 3 is specific to one particular processor architecture, one of skill in the art will recognize that other processor architectures may be modified to facilitate execution of the custom instruction apparatus 102.

An advantage of the custom instruction apparatus 102 is that a computer architecture using CISC may be minimally altered to execute the custom instruction apparatus 102. Thus, the custom instruction apparatus 102 avoids design and implementation of costly custom hardware specific to a particular workload and avoids a requirement of creation and loading of a custom instruction prior to shipment of a processor, which may not meet the needs of a particular workload.

Figure 4:
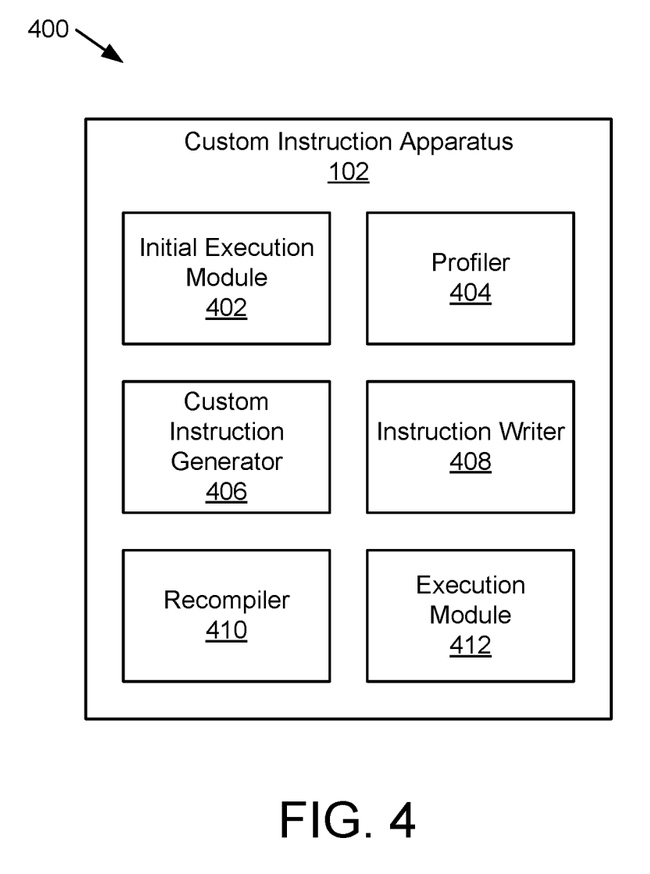
FIG. 4 is a schematic block diagram illustrating one embodiment of an apparatus for machine learning for workloads for ISA optimization.

FIG. 4 is a schematic block diagram illustrating one embodiment of an apparatus 400 for machine learning for workloads for ISA optimization. The apparatus 400 includes one embodiment of a custom instruction apparatus 102 with an initial execution module 402, a profiler 404, a custom instruction generator 406, an instruction writer 408, a recompiler 410 and an execution module 412, which are described below.

The apparatus 400 includes an initial execution module 402 configured to run program code to service a workload with a default instruction set of the processor 106. The workload is a particular workload that is run in a particular environment. For example, the workload may be for a particular implementation of a deep neural network. In other embodiments, the workload is for a matrix intensive application. In another embodiment, the workload may be for a software defined network. One of skill in the art will recognize other workloads that have repetitive tasks that may benefit from use of the custom instruction apparatus 102.

The initial execution module 402 executes program code to service the workload while using a default instruction set of the processor 106 to provide execution results that may be analyzed to identify one or more instruction sequences that maybe suitable to be replaced with one or more custom commands. For example, the default instruction set may include basic instructions, such as addition, multiplication, etc. The basic instructions may be repeated over and over in an instruction sequence. In other embodiments, an instruction sequence may take more execution time, execution cycles, etc. than other instruction sequences.

The apparatus 400 includes a profiler 404 configured to identify an instruction sequence from execution results for the workload. The instruction sequence is called repeatedly during execution for the workload. The profiler 404, in some embodiments, identifies a most frequently called instruction sequence as a candidate for replacement with a custom instruction. In other embodiments, the profiler 404 identifies an instruction sequence that takes a highest amount of processing resources, such as execution cycles or execution time. For example, an instruction sequence may include numerous instructions and the profiler 404 may determine that the instruction sequence is repeated often and take a lot of execution resources and is thus a candidate for replacement with a custom instruction.

In one embodiment, the profiler 404 includes a comparator configured to compare a number of times that an instruction sequence has been executed and with an instruction sequence repetition threshold and identifies an instruction sequence that exceeds the instruction sequence repetition threshold. In other embodiments, the profiler 404 may include other threshold criteria, such as an execution cycle threshold. The profiler 404 may also include a combination of conditions for identifying an instruction sequence. For example, the profiler 404 may identify instruction sequences that exceed both an instruction sequence repetition threshold and an execution cycle threshold. The identified instruction sequences are candidates for replacement with a custom instruction. One of skill in the art will recognize other patterns, criteria, etc. for the profiler 404 to use to identify an instruction sequence.

In some embodiments, the profiler 404 is standard profiler, such as 'gprof,' which may be used by the GNU/Linux operating systems. The profiler 404 may include other existing software profilers, such as older 'prof' tools, IBM® InfoSphere® information analyzer, SAP® Business Objects Data Services ("BODS") for data profiling, and the like. In other embodiments, the profiler 404 is a custom profiler. In other embodiments, the profiler 404 calls an existing profiler. One of skill in the art will recognize other ways that the profiler 404 may be implemented.

The apparatus 400 includes a custom instruction generator 406 configured to generate a custom instruction that includes the instruction sequence. In some embodiments, the custom instruction generator 406 creates a tag for a custom instruction and pairs it with the instruction sequence identified by the profiler 404 so that when the custom instruction is invoked, the processor 106 executes the instruction sequence. An identified instruction sequence, in some embodiments, includes instructions from the default instruction set of the processor 106. Each instruction in the default instruction set corresponds to a sequence of micro-operations.

In some embodiments, the custom instruction generator 406 correlates a sequence of micro-operations ordered to correlate to each instruction of the instruction sequence. In a very simple example, the instruction sequence may include instructions A, B and C in a sequence of ABCBC. Each instruction includes a sequence of micro-operations. The custom instruction may then include, in sequence, the micro-operations for A, then B, then C, then B, then C. In other embodiments, the custom instruction generator 406 optimizes a sequence of micro-operations to obtain a same result as the instruction sequence. For example, the custom instruction generator 406 may organize micro-operations to perform matrix operations. In other embodiments, the custom instruction generator 406 generates two or more custom instructions from two or more instruction sequences identified by the profiler 404. The custom instruction generator 406 creates a custom instruction name that differs from other default instructions of the default instruction set and is formatted to be compatible with the processor 106.

The apparatus 400 includes an instruction writer 408 configured to write the custom instruction to a writable area of processor memory 104 storing the default instruction set. In some embodiments, the instruction writer 408 transmits the custom instruction to the ISA update block 306, which writes the custom instruction to the RAM 304 of the microcode sequencer 302. In other embodiments, the instruction writer 408 communicates with other hardware elements where a processor 106 has components different than the microcode sequencer 302 and ISA update block 306 depicted in the processor 300 of FIG. 3. In some embodiments, the instruction writer 408 writes two or more custom instructions to the writable area of the processor memory. The instruction writer 408 writes the custom instruction(s) prior to execution of recompiled program code invoking the custom instruction.

The apparatus 400 includes a recompiler 410 configured to recompile program code used to service the workload where the recompiled program code includes the custom instruction. Typically, the recompiler 410 uses a compiler associated with the processor 106 to recompile the program code used to service the workload. For example, the compiler used by the recompiler 410 may be a same compiler used to compile the program code used to service the workload using a default instruction set of the processor 106 prior to execution by the initial execution module 402. The compiler looks for the instruction sequence and includes the custom instruction for the instruction sequence instead of the individual instructions in the sequence.

In some embodiments, the program code for servicing the workload is executable code of an application. In other embodiments, the program code for servicing the workload is executable code of a function in a function library. For example, an application may be used for deep neural networks. For a particular deep neural network, the application may be used with particular inputs and parameters, which are part of the workload of the deep neural network. After the application is used with the particular workload of the deep neural network and executed by the custom instruction apparatus 102 using a default instruction set of the processor 106, the profiler 404 then goes to work to identify one or more instruction sequences and the custom instruction generator 406 then creates one or more custom instructions that are particular to the deep neural network workload.

The recompiler 410 then recompiles the application with the custom instruction(s) available so the invoked compiler uses the custom instruction(s) as needed to create recompiled program code that utilizes the custom instruction(s). In other examples, the program code for servicing the workload includes a function of a function library. For example, the function library may be a Tensorflow® library and the workload may utilize one or more functions from the Tensorflow library. In other embodiments, the workload is for other applications with repetitive instruction sequences, such as a router or a firewall for a software defined network ("SDN"). One of skill in the art will recognize other types of workloads that could benefit from using the custom instruction apparatus 102.

The apparatus 400 includes an execution module 412 configured to run the recompiled program code to service the workload. Typically, the execution module 412 continues to execute the recompiled program code until completion of the workload or until commanded to stop execution.

Figure 5:
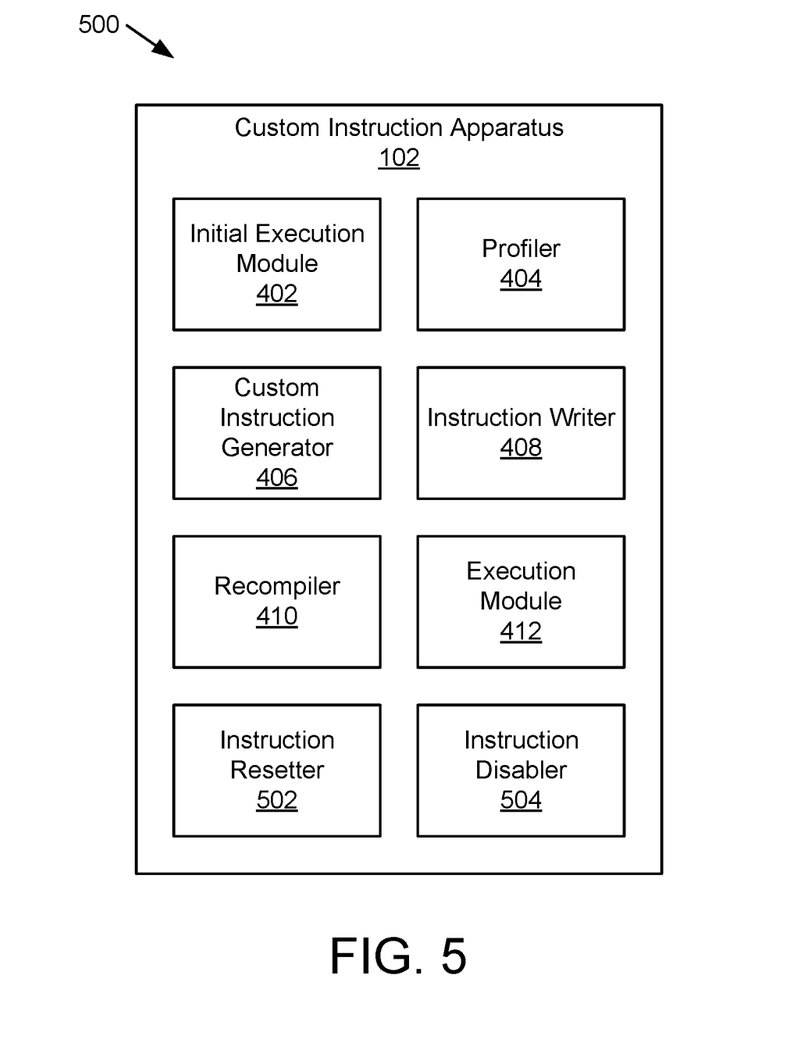
FIG. 5 is a schematic block diagram illustrating another embodiment of an apparatus for machine learning for workloads for ISA optimization.

FIG. 5 is a schematic block diagram illustrating another embodiment of an apparatus 500 for machine learning for workloads for ISA optimization. The apparatus 500 includes another embodiment of the custom instruction apparatus 102 with an initial execution module 402, a profiler 404, a custom instruction generator 406, an instruction writer 408, a recompiler 410 and an execution module 412, which are substantially similar to those described above in relation to the apparatus 400 of FIG. 4. The custom instruction apparatus 102 includes an instruction resetter 502 and/or an instruction disabler 504, which are described below.

In one embodiment, the apparatus 500 includes an instruction resetter 502 configured to remove the custom instruction from the writable area of the processor 106 in response to completion of the workload. Removal of the custom instruction allows the processor 106 to be ready for the custom instruction apparatus 102 to generate another custom instruction for a different workload without rebooting the computing device 201 with the processor 106. In some examples, the instruction resetter 502 sends a command to the ISA update block 306, which removes the custom instruction from the RAM 304 of the microcode sequencer 302. In other embodiments, the instruction resetter 502 works through other components of a processor 106 to remove the custom instruction from the writable area of the processor memory 104.

In some embodiments, the apparatus 500 includes an instruction disabler 504 configured to disable at least one default instruction of the default instruction set prior to writing the custom instruction to the writeable area of the processor memory 104. In some instances, the default instruction set is stored in processor memory 104 that does not have space for one or more additional custom instructions generated by the custom instruction generator 406. To make room for one or more custom instructions, the instruction disabler 504 is configured to disable one or more default instructions of the default instruction set. Typically, the instruction disabler 504 disables one or more default instructions that are not often used or are possibly not used by the workload. In other embodiments, the instruction resetter 502 reenables the disabled default instructions after removing the custom instructions.

Figure 6:
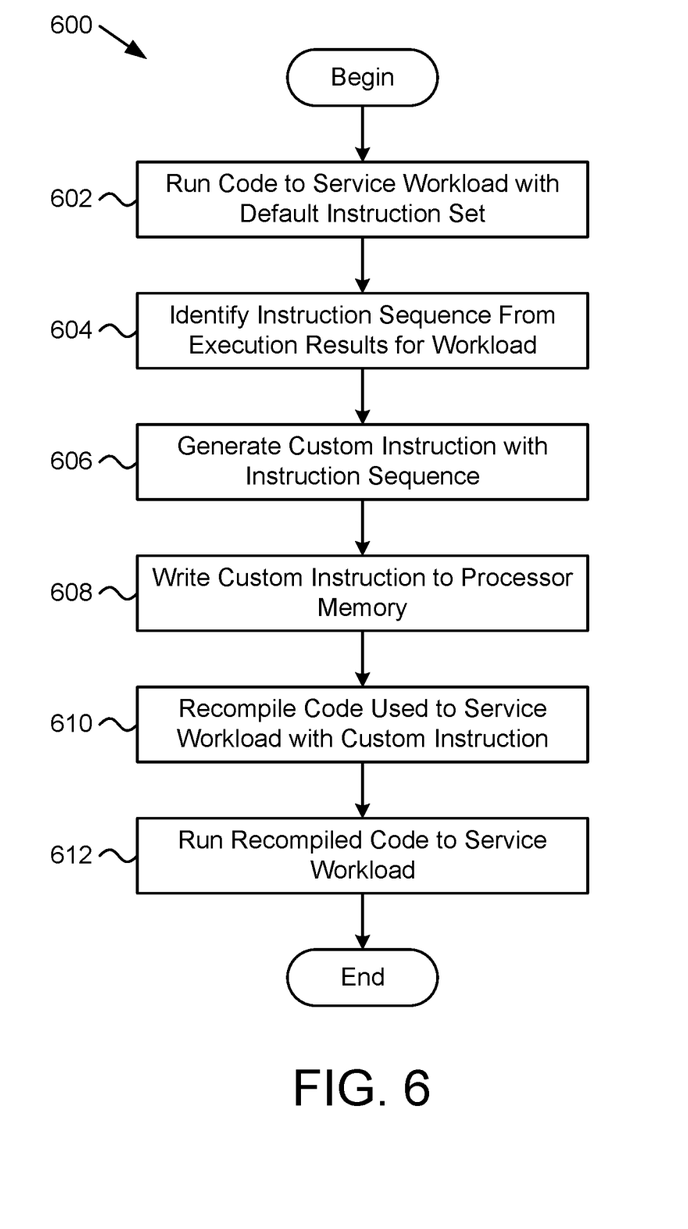
FIG. 6 is a schematic flow chart diagram illustrating one embodiment of a method for machine learning for workloads for ISA optimization.

FIG. 6 is a schematic flow chart diagram illustrating one embodiment of a method 600 for machine learning for workloads for ISA optimization. The method 600 begins and runs 602 program code to service a workload with a default instruction set of the processor 106 and identifies 604 an instruction sequence from execution results for the workload. The instruction sequence is called repeatedly during execution for the workload.

The method 600 generates 606 a custom instruction that includes the instruction sequence and writes 608 the custom instruction to a writable area of processor memory storing the default instruction set. The method 600 recompiles 610 program code used to service the workload where the recompiled program code includes the custom instruction. The method 600 runs 612 the recompiled program code to service the workload, and the method 600 ends. In various embodiments, all or a portion of the method 600 is implemented using the initial execution module 402, the profiler 404, the custom instruction generator 406, the instruction writer 408, the recompiler 410 and/or the execution module 412.

Figure 7:
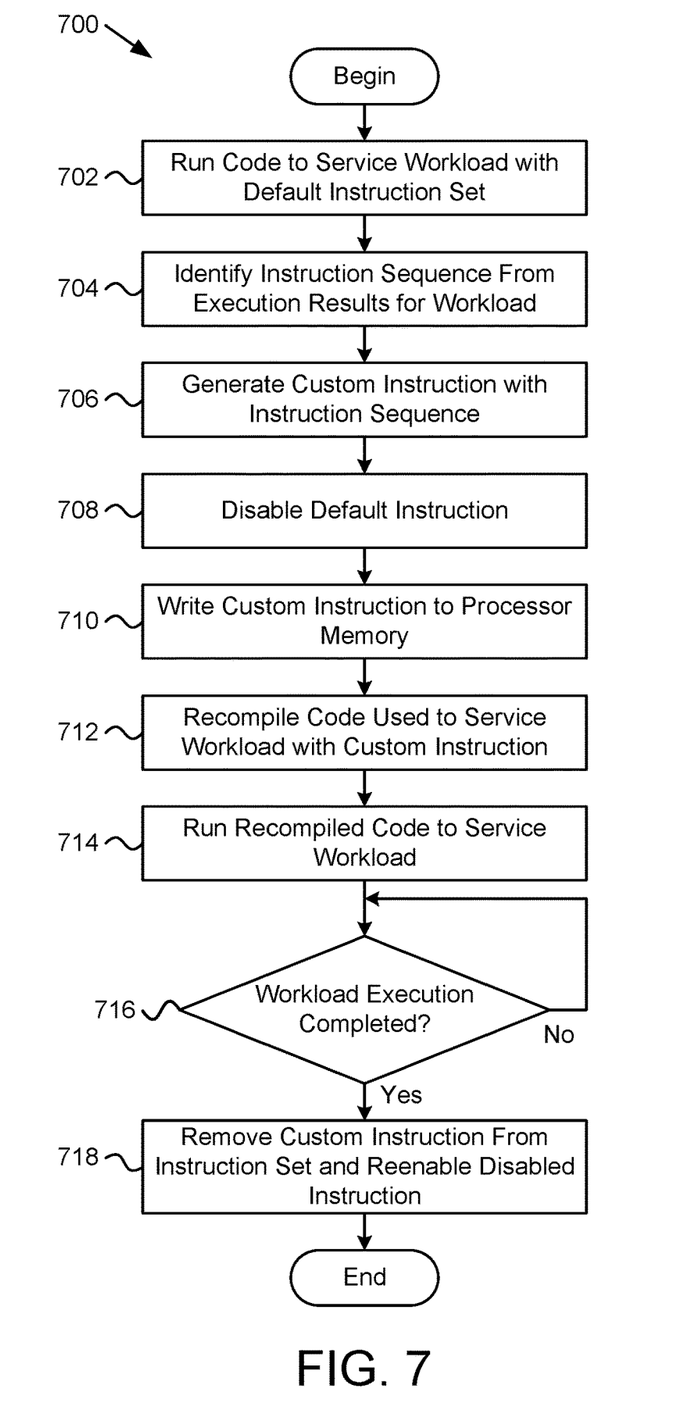
FIG. 7 is a schematic flow chart diagram illustrating another embodiment of a method for machine learning for workloads for ISA optimization.

FIG. 7 is a schematic flow chart diagram illustrating another embodiment of a method 700 for machine learning for workloads for ISA optimization. The method begins and runs 702 program code to service a workload with a default instruction set of the processor 106 and identifies 704 an instruction sequence from execution results for the workload. The instruction sequence is called repeatedly during execution for the workload.

The method 700 generates 706 a custom instruction that includes the instruction sequence and disables 708 one or more default instructions of the default instruction set to make room for custom instructions. The method 700 writes 710 the custom instruction to a writable area of processor memory storing the default instruction set. The method 700 recompiles 712 program code used to service the workload where the recompiled program code includes the custom instruction. The method 700 runs 714 the recompiled program code to service the workload and determines 716 if the workload execution is completed.

If the method 700 determines 716 that the workload execution is not completed, the method 700 returns and determines 716 if the workload execution is completed. If the method 700 determines 716 that the workload execution is completed, the method 700 removes 718 the custom instruction from the writable area of the processor and reenables disabled default instructions, and the method 700 ends. In various embodiments, all or a portion of the method 700 is implemented using the initial execution module 402, the profiler 404, the custom instruction generator 406, the instruction writer 408, the recompiler 410, the execution module 412, the instruction resetter 502 and/or the instruction disabler 504.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
run program code to service a workload with a default instruction set of the processor;
identify an instruction sequence from execution results for the workload, the instruction sequence called repeatedly during execution for the workload;
generate a custom instruction comprising the instruction sequence;
write the custom instruction to a writable area of processor memory storing the default instruction set;
recompile program code used to service the workload, wherein the recompiled program code comprises the custom instruction; and
run the recompiled program code to service the workload.

2. The apparatus of claim 1, wherein the code executable by the processor is further executable by the processor to remove the custom instruction from the writable area of the processor in response to completion of the workload.

3. The apparatus of claim 1, wherein the code executable by the processor is further executable by the processor to disable at least one default instruction of the default instruction set prior to writing the custom instruction to the writeable area of the processor memory.

4. The apparatus of claim 1, wherein the default instruction set is stored in a microcode sequencer of the processor, the microcode sequencer comprising the writable area, wherein at least the writable area of the microcode sequencer comprises random access memory ("RAM").

5. The apparatus of claim 4, wherein the processor further comprises an instruction set architecture ("ISA") update block that loads and deletes the custom instruction from the microcode sequencer.

6. The apparatus of claim 1, wherein identifying an instruction sequence from execution results for the workload comprises identifying an instruction sequence most frequency called during execution for the workload and/or identifying an instruction sequence that takes a highest amount of processing resources during execution for the workload.

7. The apparatus of claim 1, wherein recompiling the program code used to service the workload comprises using a compiler associated with the processor to recompile the program code, wherein the compiler accesses the custom instruction to recompile the program code.

8. The apparatus of claim 1, wherein the custom instruction comprises a sequence of micro-operations corresponding to micro-operations of the instruction sequence where the instructions of the instruction sequence are instructions in the default instruction set.

9. The apparatus of claim 1, wherein the program code to service the workload comprises an application and/or a function from a library.

10. The apparatus of claim 1, wherein the workload comprises a deep neural network and/or a software defined network ("SDN").

11. A method comprising:
running program code to service a workload with a default instruction set of a processor;
identifying an instruction sequence from execution results for the workload, the instruction sequence called repeatedly during execution for the workload;
generating a custom instruction comprising the instruction sequence;
writing the custom instruction to a writable area of processor memory storing the default instruction set;
recompiling program code used to service the workload, wherein the recompiled program code comprises the custom instruction; and
running the recompiled program code to service the workload.

12. The method of claim 11, further comprising removing the custom instruction from the writable area of the processor in response to completion of the workload.

13. The method of claim 11, further comprising disabling at least one default instruction of the default instruction set prior to writing the custom instruction to the writeable area of the processor memory.

14. The method of claim 11, wherein the default instruction set is stored in a microcode sequencer of the processor, the microcode sequencer comprising the writable area, wherein at least the writable area of the microcode sequencer comprises random access memory ("RAM").

15. The method of claim 14, wherein the processor comprises an instruction set architecture ("ISA") update block that loads and deletes the custom instruction from the microcode sequencer.

16. The method of claim 11, wherein identifying an instruction sequence from execution results for the workload comprises identifying an instruction sequence most frequency called during execution for the workload and/or identifying an instruction sequence that takes a highest amount of processing resources during execution for the workload.

17. The method of claim 11, wherein the processor uses a compiler in the processor to identify the instruction sequence from execution results for the workload and to generate the custom instruction.

18. A program product comprising a computer readable storage medium and program code, the program code being configured to be executable by a processor to perform operations comprising:
running program code to service a workload with a default instruction set of the processor;
identifying an instruction sequence from execution results for the workload, the instruction sequence called repeatedly during execution for the workload;
generating a custom instruction comprising the instruction sequence;
writing the custom instruction to a writable area of processor memory storing the default instruction set;
recompiling program code used to service the workload, wherein the recompiled program code comprises the custom instruction; and
running the recompiled program code to service the workload.

19. The program product of claim 18, wherein the program code is further configured to perform operations comprising removing the custom instruction from the writable area of the processor in response to completion of the workload.

20. The program product of claim 18, wherein the default instruction set is stored in a microcode sequencer of the processor, the microcode sequencer comprising the writable area, wherein at least the writable area of the microcode sequencer comprises random access memory ("RAM") and wherein the processor comprises an instruction set architecture ("ISA") update block that loads and deletes the custom instruction from the microcode sequencer.

* * * * *